April 15, 1947. T. R. POPE, SR 2,419,162
LOCATOR AND POSITION INDICATOR
Filed Jan. 19, 1946
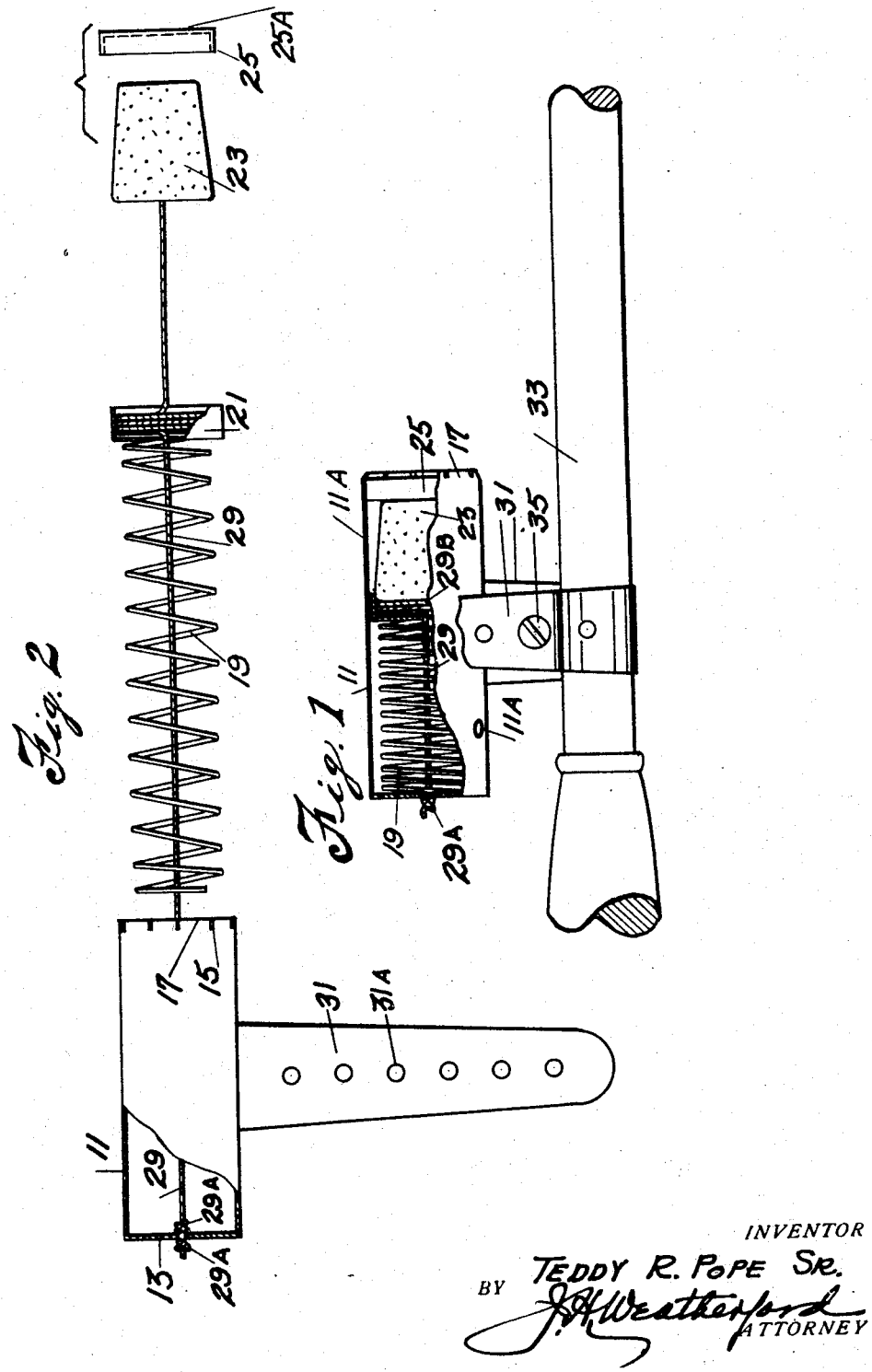
INVENTOR
TEDDY R. POPE SR.
BY Weatherford
ATTORNEY Patented Apr. 15, 1947

2,419,162

UNITED STATES PATENT OFFICE 2,419,162

LOCATOR AND POSITION INDICATOR

Teddy R. Pope, Sr., Memphis, Tenn.

Application January 19, 1946, Serial No. 642,369

2 Claims. (Cl. 9—9)

This invention relates to devices for indicating the position of articles dropped into and submerged in bodies of water, and has particular reference to devices for attachment to fishing poles or other articles used by fishermen, which devices are adapted, should the article fall into the water, to release a float attached by a line to the article, which float and line will aid in locating and subsequently recovering the article.

Fishing poles and other articles fall from fishermen's boats and are often lost when they become submerged, particularly where the water is not clear. In such cases it has been known to drop a float, sometimes with a weight attached, but these, while indicating the location, afford no aid in recovery. Also releasable floats have been attached previously to such articles as fishing poles, but these devices have been so constructed and attached to the pole that they are very often carried by the pole into the mud at the bottom of the stream or other body of water and are unable to function because of submergence in the mud.

The objects of the invention are:

To provide a position indicator including a float and carrier means therefor attachable to an article heavier than water which will forcibly impel the float and effect release thereof even though submerged in mud resisting such release;

To provide a position indicator including a float and a carrier therefor, with means for attachment to a heavier article, which includes means to forcibly impel the float from the carrier;

To provide a position indicator including a float, a carrier therefor, means for impelling said float from said carrier, and means destroyable by submergence in water for restraining release of said float until submergence accomplishes such release, in which said carrier is lighter at the float end and will eject said float away from the direction of greatest submergence;

To provide a position indicator including a float, a carrier therefor, means for impelling said float from said carrier.

The means by which the foregoing and other objects are accomplished, and the manner of their accomplishment, will readily be understood from the following specification upon reference to the accompanying drawings, in which:

Fig. 1 is a sectional side elevation of the device attached to a fragmentary portion of a pole, as a fishing rod.

Fig. 2 is a side elevation of the various parts of the device with position thereof partially in section.

Referring now to the drawings in which the various parts are indicated by numerals:

The indicator includes a tubular casing 11, having at one end a closure head 13, and having its opposite end open, with slots 15 around the periphery of the open end which provides tongues 17 which may be readily crimped. 19 is a coil spring adapted to be loosely disposed in, and compressed within, the casing 11. 21 is a shallow cup adapted to be seated against one end of the spring 19 and slidably disposed in the casing 11 for free movement therein, the cup being of such diameter that it will pass the crimped tongues 17 under action of the spring and be expelled by such action from the casing and being disposed in the casing with its top or open end faced toward the open ends of the casing.

23 is a float which preferably is of cork. 25 is a plug, destroyable by the action of water, which is adapted to closely fit the casing and to be retained therein by crimping the tongues 17. This plug has its outer surface, and preferably its peripheral edge, covered with a water-resistant coating 25A, as of paraffine, so that external moisture as water splashed thereagainst will not effect disintegration.

29 is a flexible float-line or cord which is secured at one end as by knots 29A to the head 13 and at its opposite end to the float 23, the line extending through the spring 19 and a hole in the bottom of the cup 21, into the cup in which a substantial portion of the length of the line is housed as in a coil 29B. Holes 11A in the casing allow entrance of water so that the casing will not float and the water may attack the inner surface of the plug 25 and destroy such plug on submergence in water.

A strap 31 of soft metal is secured to one side of the casing 11, this strap having holes 31A therethrough. The strap is of easily bendable metal so that it may be looped around an article, as a fishing pole 33, a short section of such a pole being shown in Fig. 1, to which the device is to be attached, and is provided with holes 31A through which a bolt 35 may be inserted to effect clamping of the strap to the article.

The device is prepared for use by threading the cord 29 through the bottom of the cup 21, the spring 19 and the casing 11 and securing the end of the cord to the head 13 of the casing, as by the knots 29A. The spring is dropped into the casing and surplus cord coiled in the cup 21. The float 23 is seated against the cord and/or the open end of the cup and the plug 25 against the float. The float and plug are forced into the casing, compressing the spring 19, as shown in Fig. 1, and the tongues 17 bent over the edge of the plug to retain it in place. The casing is secured by the straps 31 and bolt 35 to the article to which attachment is desired.

Under ordinary conditions should water be splashed on the casing no release will be effected and even momentary submergence will not be damaging if the casing be allowed to drain immediately as it may readily do through the holes 11A and around the cord knots 29A.

Should the device itself, unattached, be dropped into water as a locating device for a sunken article, might possibly sink into mud before the float is released, but the float end of the device is so much lighter than the opposite end, that even if submergence in mud should happen before release is effected by disintegration of the plug, the spring will throw the float clear of both casing and mud and the float will rise to the surface and effect the desired locating action.

Where attached to an article having a heavy end, the casing is preferably disposed with the float end facing the lighter end of the article so that the heavier end, sinking below the lighter, will likewise position the casing so that the float will be thrown free by the spring of any mud encountered and a like effect secured. Where attached to an article, the cord, if the article be not too heavy, may be used to accomplish recovery. Otherwise it can be followed directly to the article and a line of sufficient strength be attached thereto.

It will be understood that variations may be made from the details of construction here shown, as for instance the cup 21 might be omitted, without departing from the spirit of my invention, and I wish it distinctly understood that it is not my intention to limit myself to such detail except as in a claim it may be set out.

I claim:

1. A position indicator for articles submerged in water, including a tubular casing having a head at one end and open at the other and having perforations for entrance of water, a normally extended coil spring, of greater length than said casing, loosely disposed in and compressed within said casing, a shallow cup seated against said spring, a line secured at one end to said head extending through said spring and the bottom of said cup, having a substantial portion of its length coiled in said cup, a float seated against said coil and secured to the other end of said line, and a disc-like plug of material disintegratable by the action of water secured in the open end of said casing and retaining said float in said casing against the action of said spring until disintegrated by water, said plug having its outer face and peripheral edge waterproofed.

2. A position indicator for articles submerged in water, including a tubular casing having a head at one end and open at the other, and having holes for entrance of water, a normally extended coil spring, of greater length than said casing, disposed in and compressed into said casing, a float adapted to hold said spring compressed loosely disposed in said casing, a line secured at one end to said head extending through said spring and secured to said float, said line having a substantial portion of its length coiled within said casing, and a disc-like plug of material disintegratable by the action of water secured in the open end of said casing and retaining said float in said casing against the action of said spring until disintegrated by water, said plug having its outer face and peripheral edge waterproofed.

TEDDY R. POPE, Sr.

REFERENCES CITED

The following references are of record in the file of this patent:

UNITED STATES PATENTS

| Number | Name | Date |
|---|---|---|
| 2,198,755 | Berndt | Apr. 30, 1940 |
| 2,190,531 | Kaboskey et al. | Feb. 13, 1940 |
| 806,730 | Zoll | Dec. 5, 1905 |